No. 802,447. PATENTED OCT. 24, 1905.
J. GIRLOT.
MECHANICAL MANUFACTURE OF CHAIN LINKS.
APPLICATION FILED JULY 9, 1903.
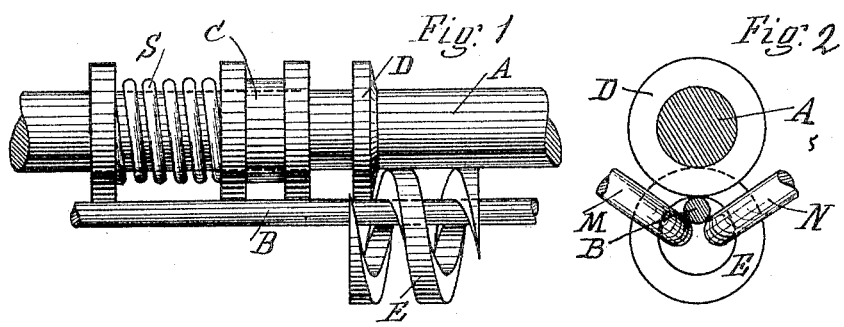
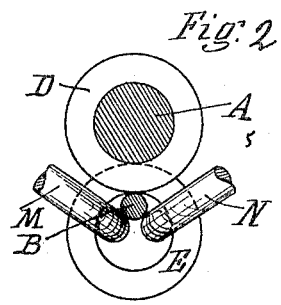
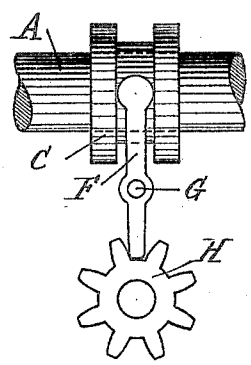
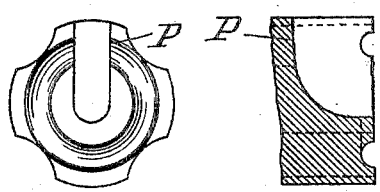
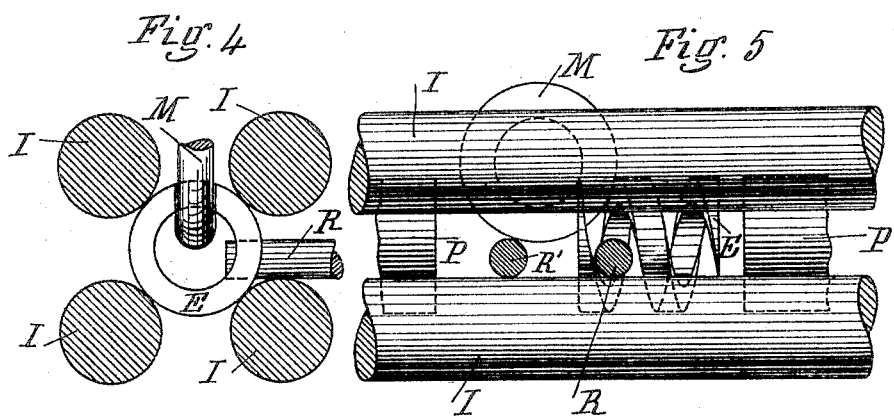
WITNESSES:
INVENTOR
JOSEPH GIRLOT
BY Howson & Howson,
HIS ATTORNEYS.

UNITED STATES PATENT OFFICE.

JOSEPH GIRLOT, OF JETTE ST. PIERRE, BELGIUM.

MECHANICAL MANUFACTURE OF CHAIN-LINKS.

No. 802,447. Specification of Letters Patent. Patented Oct. 24, 1905.

Application filed July 9, 1903. Serial No. 164,908.

*To all whom it may concern:*

Be it known that I, JOSEPH GIRLOT, a subject of the King of Belgium, residing at 254 Rue Leopold, Jette St. Pierre, Belgium, have invented certain new and useful Improvements in the Mechanical Manufacture of Chain-Links, of which the following is a specification.

The invention consists in the mode or method of mechanically linking or coupling chain-links which have been previously formed into helices or spirals with one or more finished links; also in welding and their mechanical forging, as will be afterward described. In order to carry out this mechanical manufacture, the links, which must be first formed circular, are previously brought to a helical form, leaving between the spirals sufficient separation to allow the thickness of a finished or completed link to pass. Such links may be obtained by any known means—as, for example, by spirally winding a bar on a round bar or mandrel and cutting this spiral in slices of the required size in such a manner that several layers having the thickness of the bar constitute together the size of the chain-links to be formed. Thus, for example, the slices or sections may be only the length of one spiral and a fraction, as is usual in the manufacture of chains. Having thus formed a link as just described, in order to effect the coupling or linking and the mechanical welding the following operations are necessary: First, the link must be brought to the welding temperature; second, to give it a rotating motion combined with a simultaneous longitudinal feed motion, this latter being for the purpose of advancing the link being operated upon toward the finished or completed link or links into which it is to be inserted and linked as soon as it touches the finished link or links; third, to close up or compress the spirals while the linking or coupling is taking place; fourth, to then weld the closed spirals and forge them while the link continues to turn, this forging being effected by any suitable tools, such as by stamps, the longitudinal to-and-fro movement of which effects a compression by percussion, the advantage of which is that it expels the scoria deleterious to the welding, while at the same time imparting the maximum degree of resistance and ductility to the metal. The apparatus which will now be described perfectly accomplishes all these requirements of the principle of mechanical manufacture of spirally-formed links.

In the annexed drawings, Figure 1 is an elevation of the essential parts of the apparatus. Fig. 2 is a transversal section of same. Fig. 3 is a plan view of the driving device of sleeve C. Figs. 4 and 5 show a modification of the apparatus, and Figs. 6 and 7 show a form which may be given to the pressure appliances P.

As will be seen in Figs. 1, 2, and 3, the apparatus is composed, essentially, of two shafts A B, which receive a rotary movement by any suitable means, such as by gearing. (Not shown.) The shaft A carries a collar D and a sleeve C. The fixed collar D only has, of course, its rotary motion, whereas the sleeve C has imparted to it a rapid to-and-fro longitudinal movement by means of the lever F, mounted on the axle G and operated by the toothed wheel H and the opposing spring S. The rapidity and force of the sleeve C should be suitably regulated.

The link E being operated upon and which is brought from any furnace where it is heated to a welding temperature is slipped onto the shaft B to the position shown on the drawings, and as the thickness of the spiral E is nipped between the two shafts A B the latter imparts a rotary movement to it. The edge of the collar D coming in contact with the back face of the spiral point, the effect is produced of a fixed nut causing a screw to advance. The link E receives a longitudinal forward movement and winds or links itself into the finished link or links M and N of the chain. In advancing longitudinally the front point of E butts against the edge of the sleeve C, which by its rapid to-and-fro motion continually pushes it back, so as to prevent it leaving the finished links M and N. This motion not only closes up the spirals of the link E, but also produces the compression and welding if sufficient force is imparted to it.

It is obvious that the mechanical linking or coupling operation may be done without previous heating of the links to the welding temperature if provision be made for reheating at the moment of welding.

It will be understood that it is easy to place this apparatus over an electric bath in such a way that the lower part of the link E is plunged into the bath and there becomes reheated in all its parts to facilitate the welding.

The apparatus may be modified, as illustrated in Figs. 4 and 5. The link E being formed instead of being slipped onto a shaft B, as in Fig. 1, is held between four shafts I I I I, which give it a rotary motion. To give it its longitudinal advance movement, a small transverse shaft R is arranged, to which a rotary motion is given, so that the advance movement or feed will not be impeded by friction against the sides of the finished link. Another appliance R', having a rapid to-and-fro movement parallel to the axis of the shafts I, acts as a butting-piece to hold the first spiral of E and prevent it leaving the finished link M by closing the spirals of E together. When this is effected, R and R' are drawn back quickly, which for this purpose may be both mounted on the same carriage, and the welding is effected by means of the appliances P P, which move longitudinally to act by pressure and percussion. By making the pressure appliances P P in the form shown in Figs. 6 and 7 a round section is imparted to the link being operated on.

It will be understood that the arrangements of the apparatus may be modified without departing from the principle. Thus, for example, the pressure appliances P P are given the shape shown in Figs. 6 and 7, as mentioned above. The shafts I I I I must be slightly separated from one another as the link becomes more or less finished, because the latter as it attains the round section slightly increases its exterior diameter.

Although I have shown and not claimed in this application apparatus for carrying out the herein-described method, I do not abandon my right to file a divisional application for a patent for the apparatus by which said method may be carried out.

What I claim, and desire to secure by Letters Patent, is—

1. The improved method of forming chain-links, consisting in first forming a spiral, heating it to a welding temperature, imparting to the spiral a rotary movement, whereby to thread it into a completed link or links, closing up the spiral while it is being so threaded, and welding the spiral into a link, while it rotates through the completed link or links.

2. The improved method of forming chain-links, consisting in first forming a spiral, heating it to a welding temperature, imparting to the spiral a rotary movement whereby to thread it into a completed link or links, and welding the spiral into a link while it rotates through the completed link or links.

In testimony whereof I have hereunto set my hand in presence of two subscribing witnesses.

JOSEPH GIRLOT.

Witnesses:
 GUSTAVE TIERRY,
 GREGORY PHELAN.